(12) United States Patent
Ming

(10) Patent No.: US 6,966,646 B1
(45) Date of Patent: Nov. 22, 2005

(54) SELF-ASSEMBLY GLASSES

(75) Inventor: Chen Tsai Ming, Taipei (TW)

(73) Assignee: Gazelle Corporation, Taipei (TW)

( * ) Notice: Subject to any disclaimer, the term of this patent is extended or adjusted under 35 U.S.C. 154(b) by 9 days.

(21) Appl. No.: 10/914,173

(22) Filed: Aug. 10, 2004

(51) Int. Cl.⁷ .............................................. G02C 1/00
(52) U.S. Cl. ........................... 351/86; 351/83; 351/103
(58) Field of Search ........................... 351/86, 83, 103, 351/105, 109, 41, 88, 106, 107

(56) References Cited

U.S. PATENT DOCUMENTS

| | | | |
|---|---|---|---|
| 5,379,464 A * | 1/1995 | Schleger et al. ................ | 2/431 |
| 5,841,505 A * | 11/1998 | Bolle' .......................... | 351/44 |
| 5,880,806 A * | 3/1999 | Conway ....................... | 351/86 |
| 6,193,367 B1 * | 2/2001 | Lee .............................. | 351/86 |
| 6,712,465 B1 * | 3/2004 | Teng ............................ | 351/47 |
| 6,742,890 B1 * | 6/2004 | Teng ............................ | 351/86 |
| 6,863,395 B1 * | 3/2005 | Teng ........................... | 351/103 |

* cited by examiner

*Primary Examiner*—Hung Xuan Dang
(74) *Attorney, Agent, or Firm*—Rosenberg, Klein & Lee

(57) ABSTRACT

A pair of self-assembly glasses includes a frame, a fixing member and a lens suit. The frame includes a body and a pair of arms pivotably connected to opposite sides of the body. The body is made through integral molding. A number of positioning holes are defined in the body. The fixing member is made through integral forming. The fixing member includes a pair of fixing portions with a plurality of positioning holes defined therein respectively. A number of positioning holes are defined in the lens suite corresponding to the positioning holes of the body. Thus, it is ready to assemble or disassemble the self-assembly glasses through the positioning holes of the lens suite, the fixing member and the frame.

15 Claims, 4 Drawing Sheets

SELF-ASSEMBLY GLASSES

BACKGROUND OF THE INVENTION

1. Field of the Invention

The present invention relates to a pair of glasses, and particularly to a pair of self-assembly glasses.

2. Prior Art

A pair of glasses may be used as a tool to help people to see or protect eyes. A pair of glasses may also be used as a decoration to show personal style. So one person may need different styles of glasses for different purposes. However, it is complicated to assemble the conventional glasses, which results in low assembling efficiency.

In general, a pair of conventional glasses is assembled at a glasses shop in a fixed manner. Therefore, when one person need different styles of glasses for different purposes, he or she has to buy a plurality of pairs of glasses. However, it is expensive to afford a plurality of pairs of glasses. Furthermore, after the plurality of pairs of glasses are assembled, it is hard to change their styles.

SUMMARY OF THE INVENTION

Accordingly, an object of the present invention is to provide a pair of self-assembly glasses which are ready to assemble thereby increasing assembling efficiency.

Another object of the present invention is to provide a pair of self-assembly glasses which are ready to disassemble and assemble for facilitating to replace a part or some parts thereof thereby changing style of the glasses.

To achieve the above-mentioned objects, a pair of self-assembly glasses in accordance with the present invention includes a frame, a fixing member and a lens suit. The frame includes a body and a pair of arms pivotably connected to opposite sides of the body. The body is made through integral molding. A number of positioning holes are defined in the body. The fixing member is made through integral forming. The fixing member includes a pair of fixing portions with a plurality of positioning holes defined therein respectively. A number of positioning holes are defined in the lens suite corresponding to the positioning holes of the body. Thus, it is ready to assemble or disassemble the self-assembly glasses through the positioning holes of the lens suite, the fixing member and the frame.

Other objects, advantages and novel features of the present invention will be drawn from the following detailed embodiments of the present invention with attached drawings, in which:

DESCRIPTION OF THE PREFERRED EMBODIMENTS

Figure 1:
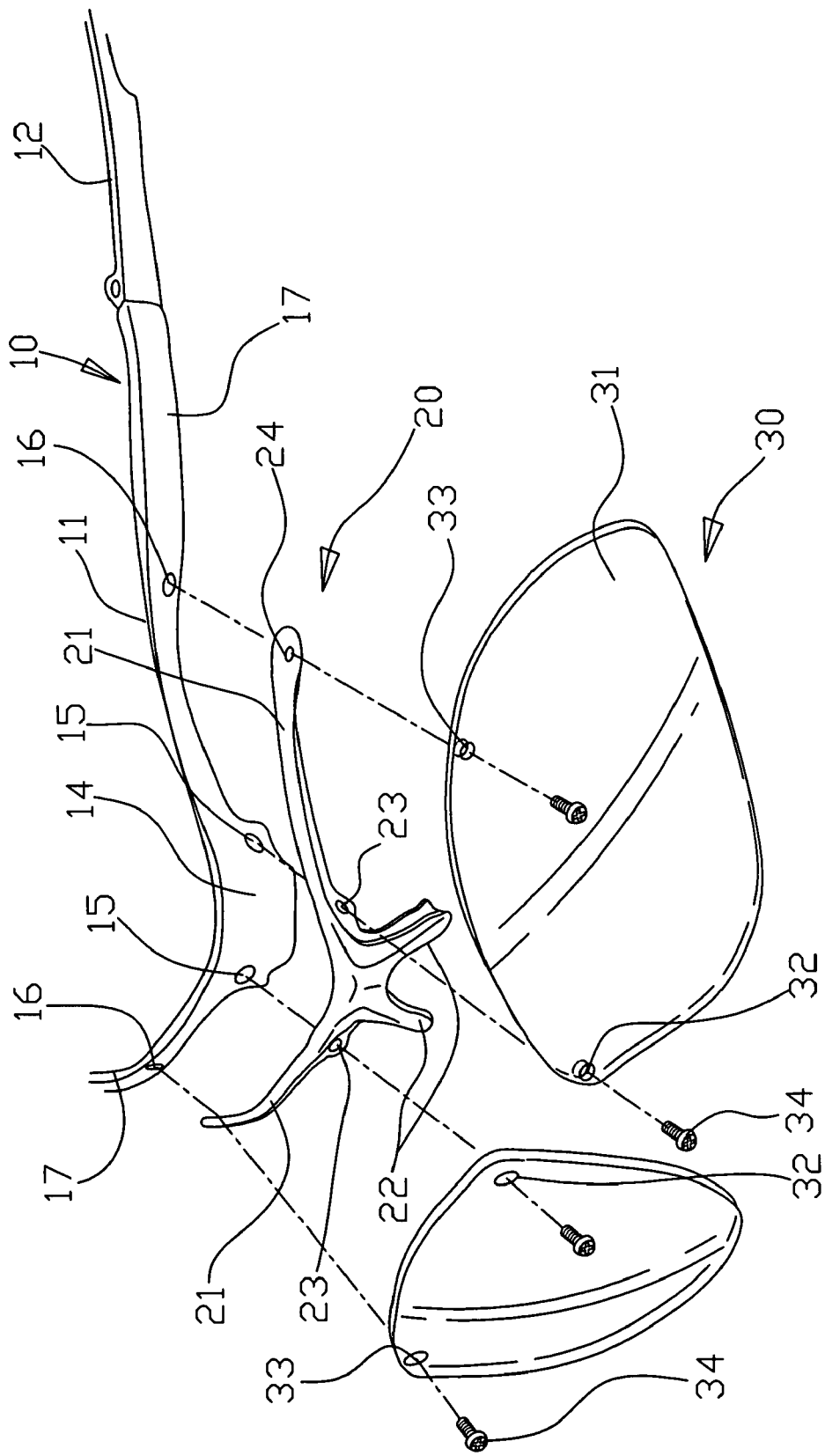
FIG. 1 is an exploded view of a pair of self-assembly glasses in accordance with a first embodiment of the present invention.
Figure 2:
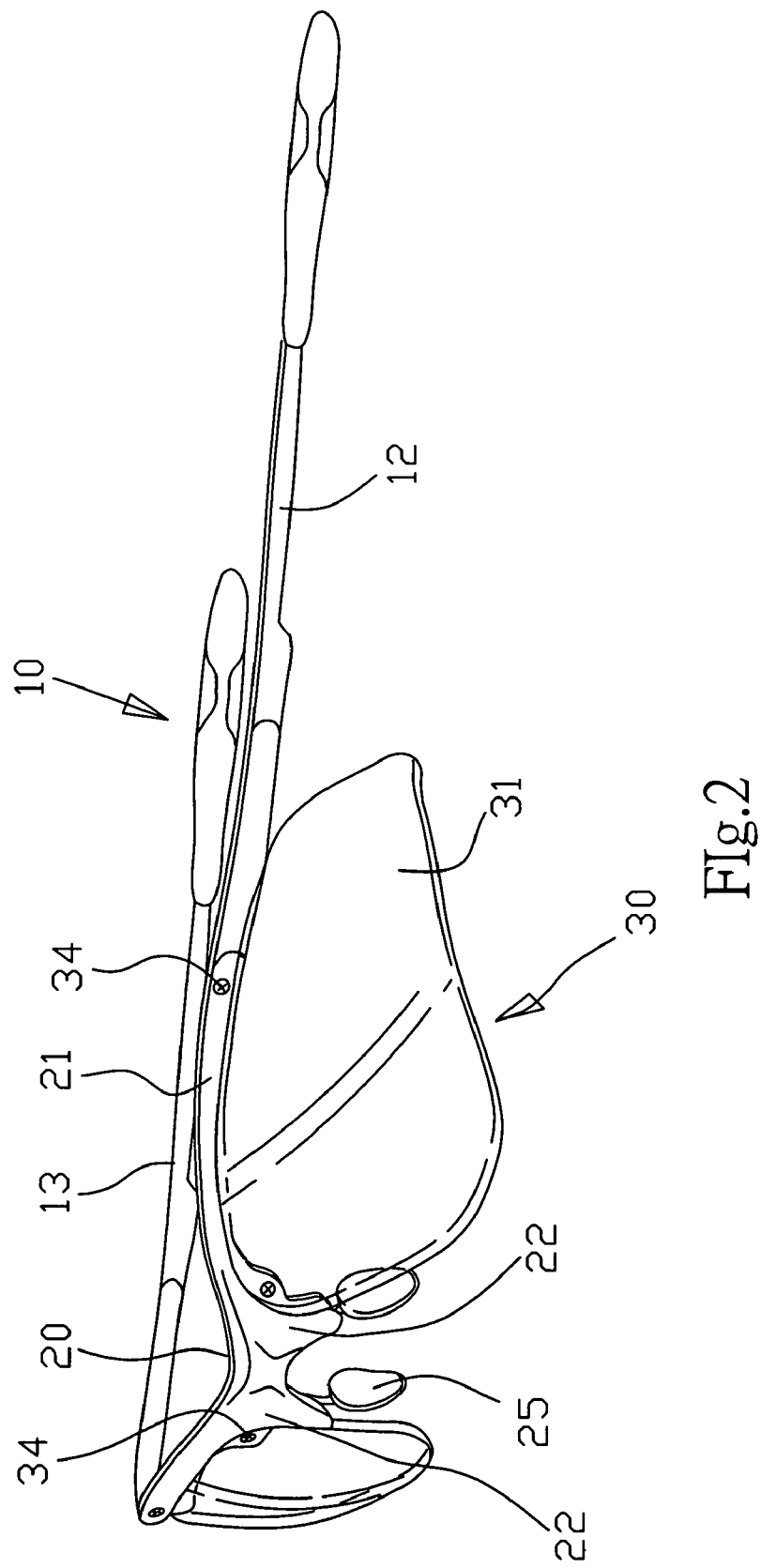
FIG. 2 is an assembled view of FIG. 1.

Referring to FIGS. 1–2, a pair of self-assembly glasses in accordance with a first embodiment of the present invention includes a frame 10, a fixing member 20 and a lens suite 30.

The frame 10 includes a body 11 and a pair of arms 12, 13 pivotably connected to opposite sides of the body 11. The body 11 is made of nylon or plastic including rubber, PC and so on through integral molding. A positioning portion 14 is formed at the center of the body 11. A pair of positioning screw holes 15 is defined in opposite sides of the positioning portion 14. A pair of connection portions 17 extends from the opposite sides of the positioning portion 14 with a pair of positioning screw holes 16 defined therein respectively. The arms 12, 13 are pivotably connected to the free ends of the connection portions 17 respectively.

The fixing member 20 is made of metal through integral forming. A pair of fixing portions 21 extends from opposite upper sides of the fixing member 20. A pair of support portions 22 extends from opposite lower sides of the fixing member 20. Two pairs of positioning screw holes 23, 24 are respectively defined in the opposite ends of each of the fixing portions 21 corresponding to the positioning screw holes 15, 16 of the body 11. As shown in FIG. 2, a pair of nose pads 25 is fixed to the support portions 22 respectively.

The lens suite 30 includes right and left lenses 31. Two pairs of positioning screw holes 32, 33 are respectively defined in upper sides of the lenses 31 corresponding to the positioning screw holes 23, 24 of the fixing portion 21 and the positioning screw holes 15, 16 of the body 11. Of cause, the lens suite 30 may be one long lens instead of the two lenses 31.

In assembly, four bolts 34 extend through the positioning screw hole 32, 33 of the lenses 31 and the positioning screw holes 23, 24 of the fixing portions 21 and engage with the positioning screw holes 15, 16 of the body 11. In disassembly, the bolts 34 are disengaged from the positioning screw holes 15, 16 of the body 11, and detached from the positioning screw holes 23, 24, 32, 33 of the fixing portion 21 and the lenses 31. Thus, it is ready to assemble the self-assembly glasses of the present invention thereby increasing assembling efficiency. It is also ready to disassemble the self-assembly glasses for facilitating to replace a part or some parts thereof thereby changing style of the glasses. Furthermore, the fixing portion 21 and the body 11 may be connected together in other manner, such as rivet joint.

The fixing portions 21 are attached to the front surface of the body 11. A pair of recesses (not shown) may be defined in the front surface of the body 11 for receiving the fixing portions 21 therein. Of cause, the fixing portions 21 may be attached to the rear surface of the body 11. A pair of recesses (not shown) may be defined in the rear surface of the body 11 for receiving the fixing portions 21 therein. Thus, the self-assembly glasses of the present invention can be assembled in different styles or manners. Furthermore, the lenses 31, the fixing member 20 and the body 11 may be configured with different colors, which results in various styles or manners of the self-assembly glasses of the present invention.

Figure 3:
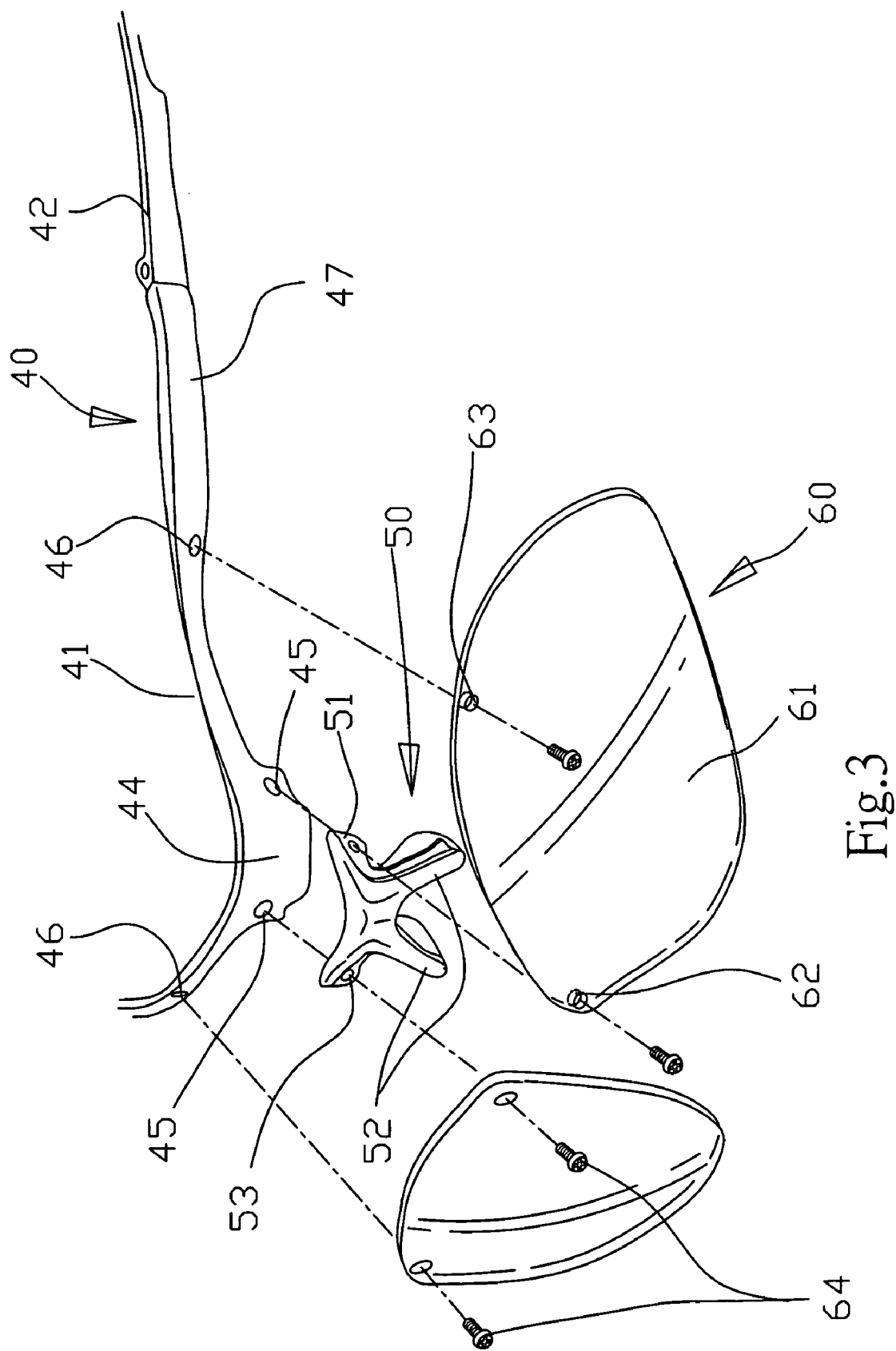
FIG. 3 is an exploded view of a pair of self-assembly glasses in accordance with a second embodiment of the present invention.
Figure 4:
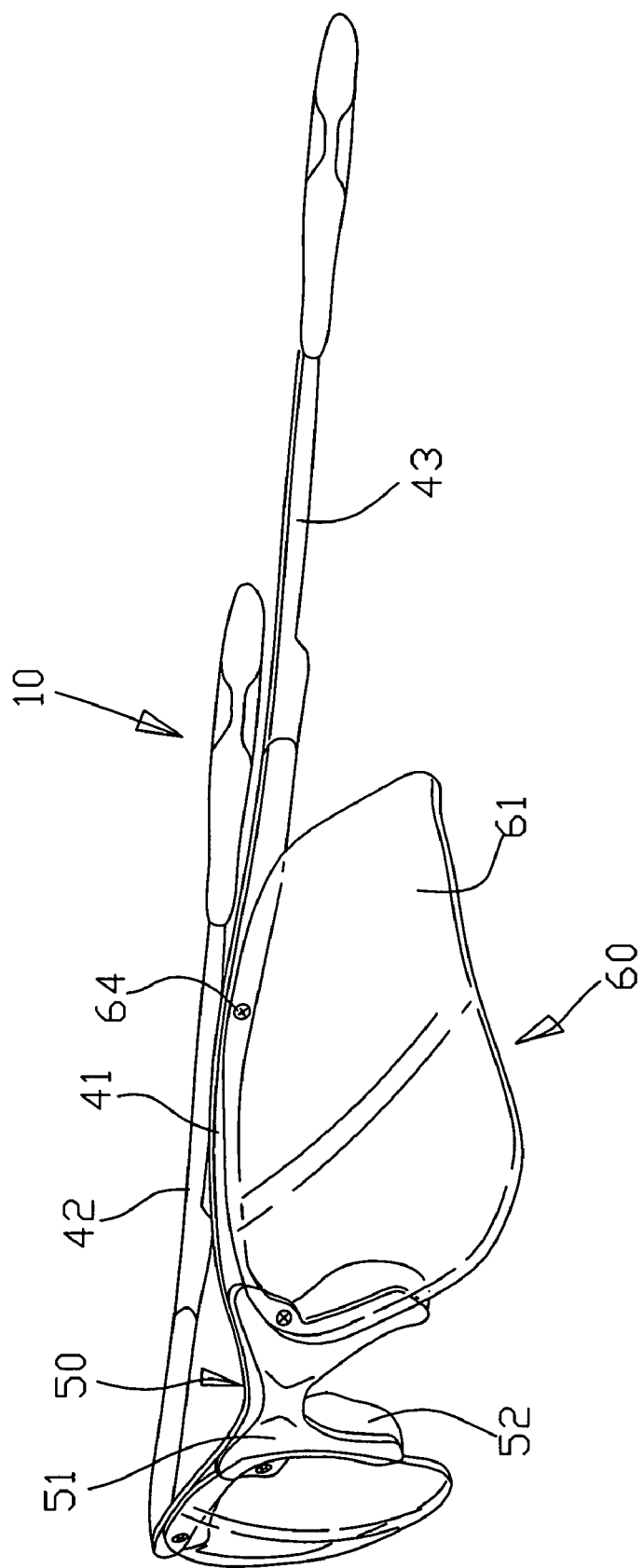
FIG. 4 is an assembled view of FIG. 3.

Referring to FIGS. 3–4, a pair of self-assembly glasses in accordance with a second embodiment of the present invention includes a frame 40, a fixing member 50 and a lens suite 60. The frame 40 includes a body 41 and a pair of arms 42, 43 pivotably connected to the body 41. The body 41 is made of nylon or plastic through integral molding. A positioning portion 44 is formed at the center of the body 41. A pair of positioning screw holes 45 is defined in opposite sides of the positioning portion 44. A pair of connection portions 47 extends from the opposite sides of the positioning portion 44 with a pair of positioning screw holes 46 defined therein respectively. The arms 42, 43 are pivotably connected to the free ends of the connection portions 47 of the body 41 respectively.

The fixing member 50 is made of metal through integral forming. Sizes of the fixing member 50 and the positioning portion 44 of the body 41 are equivalent. The fixing member 50 includes a pair of fixing portions 51 extending from opposite upper sides thereof and a pair of support portions 52 extending from opposite lower sides thereof. A pair of positioning screw holes 53 is respectively defined in the fixing portions 51 corresponding to the positioning screw holes 45 of the body 41. The lens suite 60 includes right and left lenses 61. Two pairs of positioning screw holes 62, 63 are respectively defined in the upper sides of the lenses 61 corresponding to the positioning screw holes 45, 46 of the body 41.

In assembly, a pair of bolts 64 extends through the positioning screw holes 62 of the lenses 61 and the positioning screw holes 53 of the fixing portion 51 and engages with the positioning screw holes 45 of the body 41. Another pair of bolts 64 extends through the positioning screw holes 63 of the lenses 61 and engages with the positioning screw holes 46 of the body 41. In disassembly, the bolts 64 are disengaged from the positioning screw holes 46 of the body 41 and detached from the lenses 61 and the fixing portions 51. Thus, it is ready to assemble and disassemble the self-assembly glasses of the present invention.

As described in the first embodiment, the fixing portions 51 may be attached to the front or rear surface of the body 41 and a pair of recesses (not shown) may be defined in the front or rear surface of the body 41 for receiving the fixing portions 51 therein.

As mentioned above, the lens suite 30, the fixing member 20 and the frame 10 are ready to be assembled to be the self-assembly glasses of the present invention thereby increasing manufacturing efficiency. The pair of self-assembly glasses is ready to be disassembled for replacing the lens suite 30, the fixing member 20 or the frame 10 or for changing the assembling style of the self-assembly glasses.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A pair of self-assembly glasses, comprising:
   a frame comprising a body and a pair of arms pivotably connected to opposite sides of the body, the body being made through integral molding, a plurality of positioning holes being defined in the body;
   a fixing member made through integral forming, the fixing member comprising a pair of fixing portions with a plurality of positioning holes defined therein respectively;
   a lens suit, a plurality of positioning holes being defined in the lens suite corresponding to the positioning holes of the body, whereby it is ready to assemble or disassemble the self-assembly glasses through the positioning holes of the lens suite, the fixing member and the frame.

2. The self-assembly glasses as claimed in claim 1, wherein the body is made of nylon or plastic through integral molding.

3. The self-assembly glasses as claimed in claim 1, wherein a positioning portion is formed at the center of the body with a pair of positioning screw holes defined therein.

4. The self-assembly glasses as claimed in claim 1, wherein the fixing member is made of metal through integral forming.

5. The self-assembly glasses as claimed in claim 1, wherein the fixing portions extend from opposite upper sides of the fixing member respectively.

6. The self-assembly glasses as claimed in claim 1, wherein the fixing member includes a pair of support portions extending from opposite lower sides thereof respectively.

7. The self-assembly glasses as claimed in claim 6, wherein a pair of nose pads is fixed to the support portions respectively.

8. The self-assembly glasses as claimed in claim 1, wherein the fixing portions are attached to the front surface of the body.

9. The self-assembly glasses as claimed in claim 8, wherein a pair of recesses is defined in the front surface of the body for receiving the fixing portions therein.

10. The self-assembly glasses as claimed in claim 1, wherein the fixing portions are attached to the rear surface of the body.

11. The self-assembly glasses as claimed in claim 10, wherein a pair of recesses is defined in the rear surface of the body for receiving the fixing portions therein.

12. The self-assembly glasses as claimed in claim 1, wherein a plurality of bolts is adapted to fix the body, the fixing member and the lens suite together.

13. The self-assembly glasses as claimed in claim 1, wherein the body and the fixing member are fixed together through rivet joint.

14. The self-assembly glasses as claimed in claim 1, wherein the positioning holes of the body are screw holes.

15. The self-assembly glasses as claimed in claim 1, wherein the positioning holes of the fixing member are screw holes.

* * * * *